S. BRYAN.

Cornstalk Cutter.

No. 64,743.

Patented May 14, 1867.

WITNESSES
P. T. Dodge
Agnes Tucker

INVENTOR
S. Bryan
by Dodge &hum atty

United States Patent Office.

SAMUEL BRYAN, OF JEFFERSON, WISCONSIN.

Letters Patent No. 64,743, dated May 14, 1867.

CORN-STALK CUTTER.

*The Schedule referred to in these Letters Patent and making part of the same.*

TO ALL WHOM IT MAY CONCERN:

Be it known that I, SAMUEL BRYAN, of Jefferson, in the county of Greene, and State of Wisconsin, have invented certain new and useful improvements in Corn-Harvesters; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel construction of a machine for cutting standing corn and similar crops, and for binding the same into bundles and standing the same on end in the field.

Figure 1:
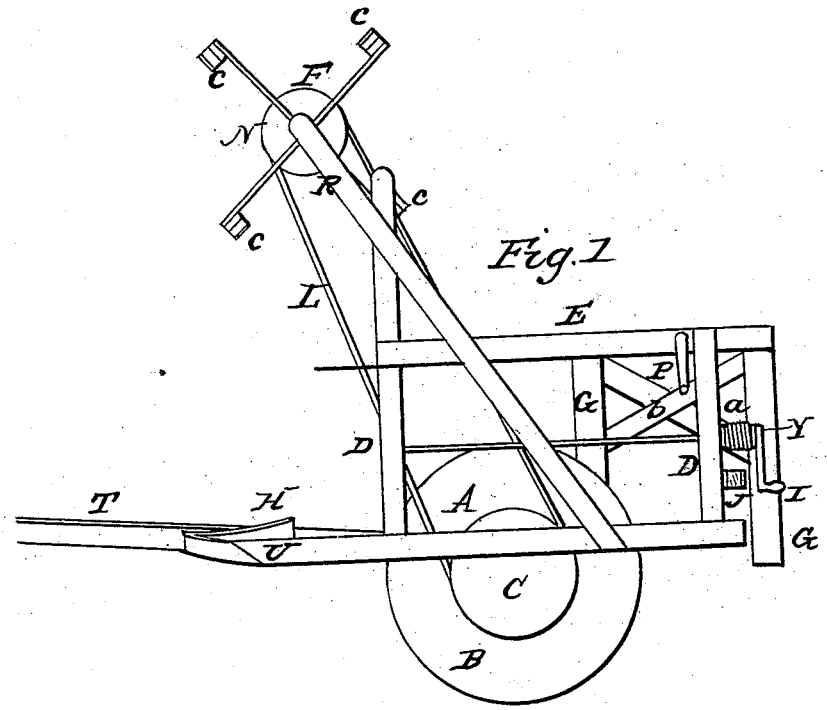

Figure 1 is a side elevation; and

Figure 2:
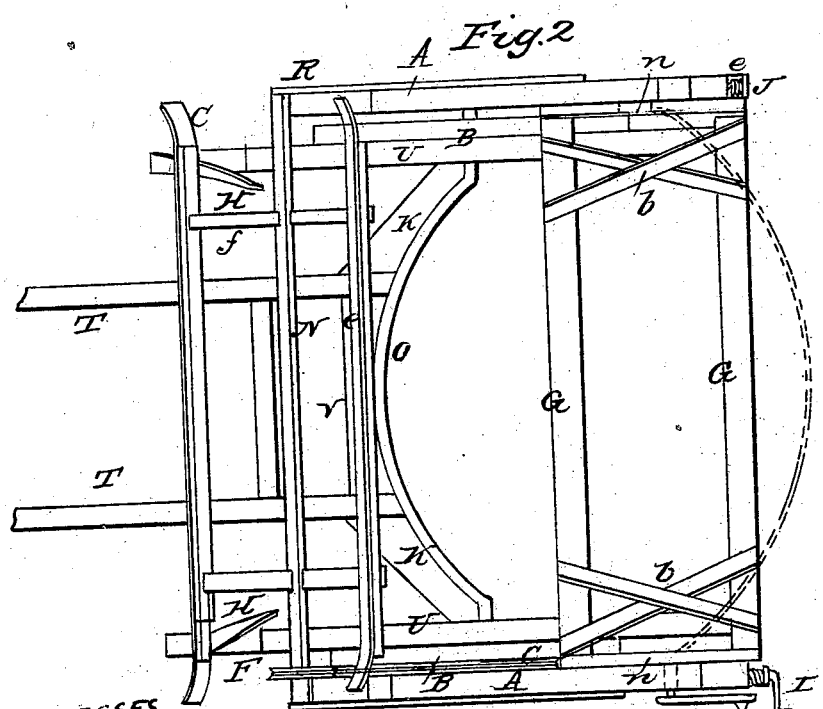

Figure 2 a plan view of my machine.

I construct a frame consisting of four longitudinal side-bars, A and U, connected by a cross-bar, V, near the front end, and mount it on two wheels B having a pulley, C, attached, as shown in the drawings. These wheels are mounted on the ends of a bent axle, O, which curves forward, as shown in fig. 2. To the front of the frame shafts T are attached for the horse, and at the rear end of these shafts, in front of the axle O, a knife, K, is secured, inclining from the shafts outward and backward, and extending to the outer bar A of the frame, as shown in fig. 2, said knife being firmly secured in place, one on each side of the shafts. To the front end of the bars U, which are placed inside of the wheels, are attached metal guards H which are inclined inward and backward, as shown in fig. 2, for the purpose of drawing or pressing the standing stalks inward and bringing them more readily in contact with the knives K. Upon the main frame are secured at each side two uprights D having a side-piece, E, attached, as shown in fig. 1; and connected to these side-frames is a bar, R, which projects over the front end of the machine and supports a reel, N, having wings c curved at their extremities, as shown in fig. 2. Motion is imparted to the reel by means of a cord, L, which passes around a pulley, F, on the reel-shaft, and is driven by the pulley C attached to the wheels B. Within the rear portion of the frame is suspended a cradle or swinging frame, G, consisting of two or more curved bars connected by cross-bars n and braces b, this frame being suspended on a single journal or pivot at each end to the side-pieces or bars E, one of said journals extending through the bar E and having a crank, P, attached, as shown. To the rear side of one of the uprights D is attached a windlass, Y, having a crank, I. On this windlass is wound a strong cord or rope, a, long enough to pass around the bundle of stalks lying on the cradle G, and have its end secured to the hook e on the opposite side of the frame. To one of the rear uprights D is secured a loose spool or drum, J, carrying the cord or wire with which to bind the stalks.

The machine being thus constructed is used as follows: A horse being attached, the machine is drawn along in such a manner as to cut the stalks of two rows at once, the machine of course being made of proper width, and the horse walking between the rows. The reel serves to bend the stalks backward, and as they are cut by the knives K they fall over on to the cradle G. When a sufficient quantity has been thus cut to form a bundle the machine is stopped, the cord a is wound around the bundle, its opposite end being secured to the hook e, and then by means of the handle I the cord is drawn tight, thus compressing the bundle, which is then bound by cord from the spool J. The cord a is then released, and the cradle G turned, as shown in red in fig. 2, which causes the bundle to slide off at its front and stand on end. The cradle is then turned over the top of the bundle and brought back to its original position ready to receive a fresh supply.

Having thus described my invention, what I claim, is—

1. The frame, consisting of the bars A and U mounted on the wheels B, with the curved axle O and knives K, arranged as shown and described.

2. I claim the swinging frame G arranged to receive and hold the cut stalks, as set forth.

3. In combination with the swinging frame G, I claim the windlass Y with its cord a, arranged substantially as set forth, for compressing the bundles for binding.

SAMUEL BRYAN.

Witnesses:
HOWARD HUNT,
SELAH S. BARNARD.